(12) United States Patent
Fleming

(10) Patent No.: US 6,991,745 B2
(45) Date of Patent: Jan. 31, 2006

(54) COATING APPARATUS AND METHODS OF APPLYING A POLYMER COATING

(75) Inventor: Robert J. Fleming, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 12 days.

(21) Appl. No.: 10/752,137

(22) Filed: Jan. 6, 2004

(65) Prior Publication Data
US 2004/0138397 A1 Jul. 15, 2004

Related U.S. Application Data

(62) Division of application No. 09/608,283, filed on Jun. 30, 2000, now Pat. No. 6,676,754.

(51) Int. Cl.
*C08G 18/61* (2006.01)

(52) U.S. Cl. .................... 252/182.14; 556/440; 528/28
(58) Field of Classification Search ............... 556/420; 252/182.14; 528/28
See application file for complete search history.

(56) References Cited

U.S. PATENT DOCUMENTS

| | | |
|---|---|---|
| 2,761,417 A | 9/1956 | Russell |
| 2,761,791 A | 9/1956 | Russell |
| 3,018,757 A | 1/1962 | Loppnow |
| 3,030,917 A | 4/1962 | Brown et al. |
| 3,150,997 A | 9/1964 | Pelletier et al. |
| 3,832,427 A | 8/1974 | Mutch |
| 3,837,771 A | 9/1974 | Kolakowski et al. |
| 3,891,785 A | 6/1975 | Zemlin |
| 3,893,410 A | 7/1975 | Herzhof et al. |
| 4,127,067 A | 11/1978 | Dahlgren et al. |
| 4,139,662 A | 2/1979 | Sitler |
| 4,165,211 A | 8/1979 | Ebeling et al. |
| 4,209,557 A | 6/1980 | Edwards |
| 4,341,822 A | 7/1982 | Singer et al. |
| 4,345,543 A | 8/1982 | Pipken |
| 4,445,243 A | 5/1984 | Bohrn et al. |
| 4,500,039 A | 2/1985 | Pacifici et al. |
| 4,515,646 A | 5/1985 | Walker et al. |
| 4,523,003 A | 6/1985 | Bezwada |
| 4,710,560 A | 12/1987 | Vu |
| 4,876,308 A | 10/1989 | Melby et al. |
| 4,935,264 A | 6/1990 | Tsujino et al. |
| 5,200,262 A | 4/1993 | Li |
| 5,283,101 A | 2/1994 | Li |
| 5,316,838 A | 5/1994 | Crandall et al. |
| 5,328,509 A | 7/1994 | Essex |
| 5,451,447 A | 9/1995 | Li |
| 5,474,827 A | 12/1995 | Crandall et al. |
| 5,506,000 A | 4/1996 | Leonard |
| 5,584,958 A | 12/1996 | Gillis et al. |
| 5,587,502 A | 12/1996 | Moren et al. |
| 5,645,938 A | 7/1997 | Crandall |
| 5,962,108 A | 10/1999 | Nestegard et al. |
| 5,976,669 A | 11/1999 | Fleming et al. |
| 6,117,236 A | 9/2000 | Ruschak et al. |
| 6,403,175 B1 | 6/2002 | Speier et al. |
| 6,676,754 B1 | 1/2004 | Fleming et al. |

FOREIGN PATENT DOCUMENTS

| | | |
|---|---|---|
| DE | 1 235 723 | 3/1967 |
| EP | 0 794 011 | 9/1997 |
| EP | 0 997 446 | 5/2000 |
| GB | 1027921 | 4/1966 |
| JP | 9-119079 | 5/1997 |
| JP | 10 330386 | 12/1998 |
| WO | WO 96/38453 | 12/1996 |
| WO | WO 98/18844 | 5/1998 |
| WO | WO 98/25984 | 6/1998 |
| WO | WO 98/28642 | 7/1998 |

OTHER PUBLICATIONS

"Urethane Processing System: Instruction Manual," Max Machinery Pub. No. 600-000-350, 1992, rev Jan. 1998.
Max Machinery, Mix Head Configurations, printed in color from www.maxmachinery.com, Jul. 7, 2000, pp. 1-6.
Evan, Robert M.; "Polyurethane Sealants—Technology and Applications" Technomic Publishing Co., Inc., p. 147-155; 1993.
Cohen et al.; "Modern Coating and Drying Technology"; VCH Publishers, Inc.; pp. 1-21; 1990.

*Primary Examiner*—Rachel Gorr
(74) *Attorney, Agent, or Firm*—Jay R. Pralle

(57) ABSTRACT

Methods of applying a polymer coating to a substrate are disclosed. By disrupting a bank of polymer precursor, a smooth coating of fast setting polymer can be applied to a substrate. Apparatus for applying a polymer coating is also disclosed. In one embodiment, an oscillating dispenser is used to apply polymer precursor onto a dispersive surface. The polymer precursor flows down the surface and is transferred to a moving web. Flowing solvent downwardly through the dispenser can provide efficient cleaning without the need for disassembly or production delays.

12 Claims, 8 Drawing Sheets

HPTESC

HPDEMSC

COATING APPARATUS AND METHODS OF APPLYING A POLYMER COATING

CROSS REFERENCE TO RELATED APPLICATIONS

This application is a divisional of U.S. patent application Ser. No. 09/608,283, filed Jun. 30, 2000, now allowed as U.S. Pat. No. 6,676,754, the disclosure of which is herein incorporated by reference.

TECHNICAL FIELD

The present invention relates to methods and apparatus for applying a polymeric coating to a substrate.

BACKGROUND

Processes and apparatus for application of polymer coatings onto moving webs have long been used in the manufacture of: carpets, fabrics (such as waterproof fabrics), decals, flexible composites, and many other commercially important articles. Coating polymeric layers onto web-type substrates has long been an area of great technological interest. Common coating methods include: dip coating, rod coating, knife coating, blade coating, air knife coating, gravure coating, forward and reverse roll coating, slot and extrusion coating, slide coating and curtain coating. See Cohen, E. in "Modem Coating and Drying Technology," Chap. 1, VCH Publishers, ISBN 1-56081-097-1.

A brief review of a few patents for coating apparatus and processes is provided below.

Zemlin in U.S. Pat. No. 3,891,785, issued in 1975, discloses a solvent-free, two-part system for forming a polyurethane coating. In Zemlin's process, a rapidly mixed composition is deposited on a moving fabric. The fabric carries the composition under a knife member that limits the amount of composition carried forward and spreads the composition as a layer on the surface. A rolling bank is created in front of the knife member. Shear-thinning is an important property of Zemlin's reaction mixture. As deposited on the moving surface, shear is very low and viscosity of the mixture can reach high values. Shear increases in the rolling bank, and reaches a maximum during the knifing process.

Herzhoff et al. in U.S. Pat. No. 3,893,410 discloses a cascade coater having an inclined flow plane interrupted by a delivery gap for each coating liquid. The liquids flow down to form a coating meniscus and are coated onto an upwardly moving sheet. Similarly, Russell in U.S. Pat. No. 2,761,791 describes a process in which four separate coating compositions are pumped onto slide surfaces down which they flow by gravity to form separate layers that flow down toward a coating bead. The four layers are picked up by an upwardly moving web to form a four layer laminate on the web.

Sitler in U.S. Pat. No. 4,139,662 discloses a coating apparatus in which two compositions are combined in a mixing head and dispensed through a hose. The hose is attached to a conventional reciprocating device that causes the opening of the hose to reciprocate between ends of a trough. The trough is positioned above and perpendicular to a sheet material that travels thereunder. A threaded rod is positioned within the trough and meters the fast-reacting saturant from the trough, through a slot, and onto the moving web of sheet material.

Fast setting chemistry is advantageous for applying polymer coatings; however, a significant problem is polymer setting within the coating apparatus. Mutch in U.S. Pat. No. 3,832,427 discusses the need to design apparatus that can be conveniently opened for manual cleaning, such as brushing and scraping. In Mutch's apparatus, at the end of an operation, the controls are operated to lift the applicator die clear of the table and a solvent and air purge are blown through the mixer and applicator die. Even after this procedure, Mutch remarks that the internal surface of the die passages still need manual cleaning after the die is opened.

Pipken in U.S. Pat. No. 4,345,543 discloses a method and apparatus for coating a moving web. In this method, coating material is fed from a conduit directly into a coating bank. A web passes by one side of the coating bank. Coating material is pulled down between the web surface and the surface of a smoothing film that is backed by a pliable membrane. The force generated by the pliable membrane controls the thickness of the coating.

From the patent and scientific literature, it is clear that there has been a continuing desire for new processes that are more effective, faster, and require fewer resources (i.e., is less expensive). The need for apparatus that is capable of handling fast-setting mixtures and is easy to clean, has long been recognized. Additionally, environmental concerns, such as the desire to reduce or eliminate solvents and avoid spray processes (which can result in airborne pollution), have been of increasing importance over the last 30 years.

BRIEF SUMMARY

In one aspect, the invention provides a coating apparatus, comprising: a dispersive surface; a receiving support having a surface opposed to the dispersive surface; at least one chemical dispenser disposed such that, during operation, the dispenser can dispense a polymer precursor composition onto the dispersive surface; and a bank disrupter disposed in an area between the dispersive surface and the receiving support. Preferably, the dispersive surface and the receiving support define a gap therebetween such that, during operation, the polymer precursor composition flows along the dispersive surface toward the gap. During operation, a coating bank that occupies an area between the dispersive surface and the receiving support is disrupted by the bank disrupter.

In another aspect, the invention provides a coating apparatus, comprising: a dispersive surface; a web having a first surface opposed to the dispersive surface; and at least one oscillating chemical dispenser disposed such that, during operation, the dispenser can dispense a polymer precursor composition onto the dispersive surface without dispensing directly onto the web or a coating bank. The dispersive surface and the web define a gap therebetween such that, during operation, the polymer precursor composition flows along the dispersive surface toward the gap.

In a further aspect, the invention provides a coating apparatus, comprising: a web that is disposed on rollers such that, during operation, the web is moved by rotation of the rollers; the web having an upper and a lower surface, and a width; a chemical dispenser that is disposed such that it is capable of dispensing a polymer precursor composition onto the upper surface of the web; a secondary surface disposed opposite a portion of the upper surface of the web, wherein the secondary surface and the upper surface of the web are spaced from each other; a closest approach of the secondary surface to the upper surface of the web that defines a gap; and a moveable bank disrupter probe disposed such that, during operation, the probe extends into the bank of polymer precursor composition and moves in a direction parallel to the width of the web. During operation, a bank of polymer precursor composition forms adjacent to the gap. That the disrupter "moves in a direction parallel to the width of the carrier sheet," does not limit the probe to moving exclusively in this direction, for example, the probe could move in a zig-zag or wave pattern. However, in a preferred embodiment, the probe moves in a straight line parallel to the sheet width—this configuration can be simple to construct, reliable in operation, yet provide effective disruption of the coating bank.

In another aspect, the invention provides a process of applying a polymer to a substrate. The process comprises: forming a bank of the polymer precursor composition, wherein a portion of the bank is in contact with a surface of the substrate; disrupting the bank of polymer precursor composition; and moving the substrate past the bank of polymer precursor composition.

The invention also provides a process of using a coating apparatus to apply a polymer to a substrate. The coating apparatus comprises: a dispersive surface; a receiving support having a surface opposed to the dispersive surface; and at least one chemical dispenser that is disposed such that, during operation, the dispenser can dispense a polymer precursor composition onto the dispersive surface. The dispersive surface and the receiving support define a gap therebetween such that, during operation, the polymer precursor composition flows along the dispersive surface toward the gap. Preferably, the gap is disposed such that, during operation, gravity will pull the polymer precursor composition down the slope of the dispersive surface and toward the gap. The process comprises: passing a polymer precursor composition through a coating apparatus, dispensing a polymer precursor composition downwardly from the chemical dispenser onto the dispersive surface; moving the web simultaneously with dispensing the polymer precursor composition; and subsequent to the dispensing, cleaning the chemical dispenser and dispersive surface by flushing downwardly through the dispenser a cleaning solution that removes residual polymer precursor composition from the dispenser and the dispersive surface.

The invention further provides a composition comprising a mixture of dialkoxy and trialkoxy hydroxyalkylenecarbamoylalkylene-alkoxysilanes in which the molar ratio of dialkoxy to triethoxy hydroxyalkylenecarbamoylalkylene-alkoxysilane is in the range from about 1:3 to about 3:1; and articles made from this composition. It has been discovered that articles made from this composition exhibit surprisingly good laundering durability after aging.

Many disclosed embodiments can provide numerous advantages such as: the ability to function without the use of solvents or nonreactive diluents, economical and reliable processing, the ability to use fast-setting reactive chemistry without clumping, processing that can be discontinued and apparatus that can be cleaned without significant downtime, the ability to rapidly change chemical components to vary product properties even during the same production run, the ability to operate with a single wide-bore dispenser, high production rates, the capability to operate at high web speeds over wide substrates, compatibility with a large variety of substrates, the ability to produce smooth polymer coatings without ribbing, gels or streaks, and/or final products that can exhibit desirable properties such as excellent adhesion and launderability.

These and other advantages are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

GLOSSARY

"Bank disrupter" can be a static disrupter that disrupts rotational flow within a coating bank, or, more preferably, an active disrupter such as a moving probe. Although the active disrupter typically disrupts flow within a coating bank, flow analysis is not a requirement for defining the active disrupter.

"Coating bank" is a bank of polymer precursor composition that contacts the web and the dispersive surface and has a thickness greater than the thickness of the coating on the coated web.

"Dispersive surface" means any surface over which the polymer coating composition can flow.

A "carrier support" is a support for a web material.

A "gap" is the space between a knife member and the receiving surface (such as a web surface) that controls the thickness of the coating. In many embodiments, the distance of this space varies and in this (most typical) case, the gap is defined by the closest approach of the knife member and the receiving surface. In many preferred embodiments, the dispersive surface is also the knife member.

"Moveable substrate" means a web or other material capable of being moved through a coating bank.

"Polymer" means a molecule that is made up of at least five repeating units that are regularly or irregularly arranged.

"Polymeric" means containing a polymer.

"Polymer precursor composition" refers to a composition that comprises reactive monomers, oligomers, and/or polymers that, during processing, react to form higher molecular weight polymeric material.

A "receiving support" is either a carrier support or a moveable substrate.

DETAILED DESCRIPTION OF ILLUSTRATIVE EMBODIMENTS

In describing illustrative embodiments of the invention, specific terminology is used for the sake of clarity. The invention, however, is not intended to be limited to the specific terms so selected, and it is to be understood that each term so selected includes all technical equivalents that operate similarly.

Figure 1:
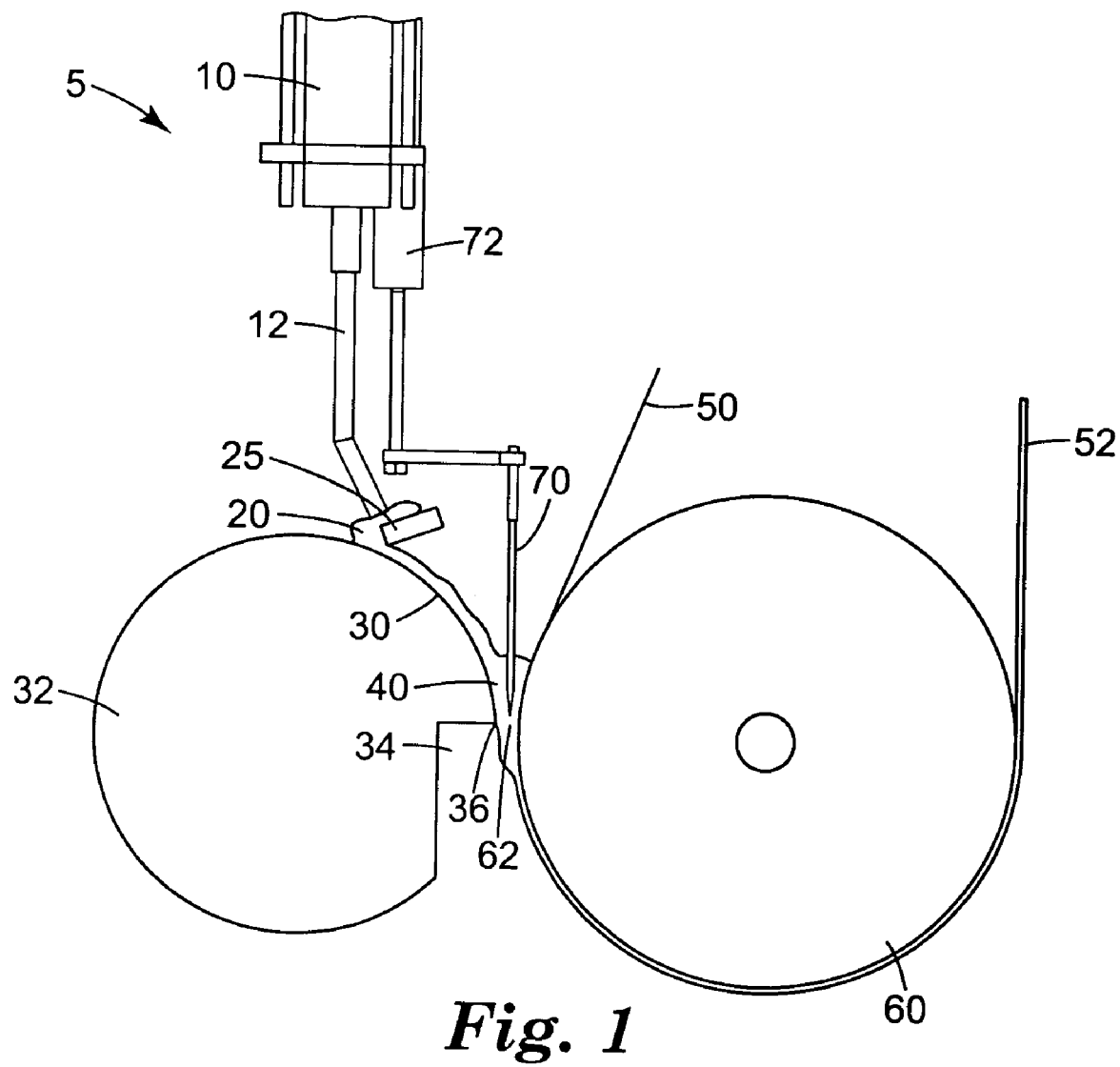
FIG. 1 is a side view of a disclosed coating apparatus.

The figures illustrate an embodiment of coating apparatus 5 that includes an oscillating chemical dispenser 10, which, during operation, oscillates back and forth while dispensing a polymer precursor composition 20 onto optional baffle 25 and dispersive surface 30. In the embodiment shown, dispersive surface 30 is a surface of coating bar 32. The polymer precursor composition 20 flows by gravity down into coating bank 40. A web material 50 moves downwardly (counter-clockwise in FIG. 1) past the coating bank 40, is coated by the polymer precursor composition and leaves carrier roll 60 as a coated web 52. During operation, a disrupter 70 disrupts the coating bank 40 to prevent the formation of clumps of polymer that would cause an uneven distribution of coating material on coated web 52. The thickness of the coating on the web can be modified by controlling the gap 62 (i.e., the shortest distance) between the surface of web 50 and the dispersive surface 30.

The oscillating chemical dispenser 10 can distribute polymer precursor composition over the dispersive surface. Oscillation can be accomplished by various means as are known in the art. Preferably, the dispenser is mounted on a track and oscillated back and forth. One suitable commercial oscillator is available from Hoerbiger-Origa Corp., Glendale Heights, Ill. (rodless cylinder part no. 25-2021/20×26-B-M; RS limit switches part no. 2676-0201/5). The width of oscillation can be set to any desired width, for example, a narrow width could be selected for stripes and a varying width could be selected for patterns. Typically, the width of oscillation corresponds to the width of the web 50 to achieve an even coating over the entire width of the web. In an embodiment for coating the entire width of a web, the width of oscillation is preferably about 85 to 100% of the web's width; more preferably about 90 to 95%. The rate and period of oscillation is preferably controlled to distribute composition evenly over the dispersive surface; techniques for accomplishing this are known in the art, see, e.g., U.S. Pat. No. 4,209,557. In a preferred embodiment, the dispenser is also a mixer. Reactive components can be carried by separate lines and combined in the mixer. Nonlimiting examples of mixers include gear mixers, static mixers and media mixers. Preferably, the mixer is a pin mixer which is a device having a shaft and pins extending outward from the shaft, the shaft rotating within a chamber with pins located around the internal circumference of the chamber pointed inwards toward the rotating shaft, with the pins positioned on the chamber such that they alternate with the position of the pins located on the shaft. Suitable pin mixers are commercially available. One example of a suitable pin mixer is available from Max Machinery, Inc. (Healdsburg, Calif., USA) and is essentially similar to that described on pages 46–47 of Max Machinery's "Urethane Processing System: Instruction Manual," pub. no. 600-000-350 (Rev 1/98). Element 14 shown in the figures is an optional heat exchange element that can be used to control temperature of a mixing dispenser.

A discharge tube 12 can be used to transport polymer precursor composition from the mixer 10 to near the dispersive surface 30. Preferably, the apparatus operates with a single dispenser. In less preferred embodiments, multiple dispensers can dispense the same or different compositions. For example, two or more reactive components can be dispensed from separate dispensers. Preferably the discharge tube has a wide bore rather than a slot, shower head or spray nozzle configuration which are relatively easy to clog and difficult to clean. This reduces gel buildup at the tube walls. If too large a bore is used, gelling narrows down the bore size until turbulent flow is reached, however, there is a risk that gels will eventually work themselves out. If too small a bore is used, unecessary pressure is generated and flow exiting the tube has too much velocity which can affect the coating process by flowing too quickly over the dispersive surface. A preferred discharge tube cross sectional area is about 0.3 to about 20 $cm^2$, more preferably 1 to 5 $cm^2$. While the inventive apparatus can be used for laboratory-scale operation, it is preferably applied to industrial scale operation. Therefore, the dispenser should be capable of high throughputs, preferably greater than 3000 grams per minute (g/min) of reactive components (i.e., not including solvents or nonreactive diluents).

The polymer precursor composition 20 is dispensed onto dispersive surface 30. The polymer precursor composition might first be dispensed onto (or at least partly onto) optional baffle 25. Typically, the baffle is at least as long as the length of oscillation. It is believed that the greater the viscosity difference from the feed material to the fluid in the bank, the greater the amount of dispersive surface is needed for good coatings because material takes longer to get to the bank and enters the bank more continuously rather than in bursts. The baffle can provide additional dispersive surface area and can assist in forming a curtain of material 20 that falls onto dispersive surface 30. The baffle is optional because it has been discovered that, in some systems, excellent coatings can be obtained without a baffle.

The dispersive surface 30 helps control the flow of polymer precursor composition into coating bank 40. The dispersive surface can have a variety of shapes including, but not limited to, arc, straight ramp, and curved ramp. In a preferred embodiment, the dispersive surface has a surface coating, such as TEFLON, that protects the surface and makes it easier to clean. In another preferred embodiment, the dispersive surface is covered with a film, such as a polyethylene film, which, after use, is cleaned or thrown away and replaced with a new film. It is believed that dispensing the composition directly into the coating bank, without first passing over the dispersive surface 30, can result in undesirable effects such as streaking that tracks with discharge tube 12. The dispersive surface is also advantageous because it allows a smaller coating bank with continuous flow into the coating bank.

In the embodiment shown in the figures, the dispersive surface is part of the surface of coating bar 32. In the illustrated embodiment the coating bar has a notch 34 that can help prevent uneven coating effects such as ribbing; however, in many circumstances, even coatings can be obtained without a notch. Temperature variations in the coating bar could cause deflection and/or bending in the coating bar causing variations in coating thickness. Therefore, it is preferable to actively control the temperature of the dispersive surface such as by passing a heated or cooled fluid through the coating bar. Surface 30 is preferably smooth to avoid pockets of polymer curing on surface 30.

The coating bank 40 is bounded on one side by the dispersive surface 30 and on another side by a surface of web 50. The bottom of the coating bank is defined as the closest approach of the dispersive surface 30 and the web 50 (gap 62 in FIG. 1). The width of the top surface 48 of the coating bank is preferably at least three times that of gap 62, more preferably about 100 to about 4000 times larger. In one embodiment useful for manufacture on an industrial scale, the width of the top surface is preferably in the range of about 1 cm to about 4 cm. Length of the coating bank is defined as the dimension parallel the axis of the coating bar 32 or carrier roll 60, height is the direction perpendicular to the width that is the shortest distance between the gap 62 and top surface 48 of the coating bank, and width is the direction perpendicular to height and length. The height 44 of the coating bank is preferably about 1 to about 12 cm, more preferably about 2 to about 5 cm. Too small a height (and too small a volume) can cause an uneven coating. Too large a height can lead to gel formation within the coating bank and result in clogging, streaks or a clumpy coating. In a preferred embodiment, at least one side of the coating bank is an inverted arc, more preferably two sides are inverted arcs. Typically, each end of the coating bank is bounded by an edge dam (not shown). Preferably, the edge dams are shaped and positioned to conform to the surfaces of web 50 and dispersive surface 30. The edge dams preferably should not touch the web's surface, although some minimal contact may be acceptable. In this manner, the length of the coating bank can be precisely controlled.

In the illustrated embodiments, the gap 62 controls the coating thickness. When no solvent is present in the polymer prescursor composition, the coating thickness is between about 50 to 100% of the gap width, and there is relatively little shrinkage during curing. The gap width can be adjusted to achieve the desired coating thickness. In some preferred embodiments, the gap width is between about 25 micrometer (:m) and 1000 :m, more preferably between about 100 and 500 :m. If uniform coatings are desired, it is important that the gap have a constant width across the desired coating width. Thus, in preferred embodiments, the dispersive surface also acts as a knife member that controls coating thickness. In other embodiments (not shown), the coating thickness may be controlled by a separate knife member. For example, if the movement direction of web 50 were reversed, a knife member (not shown) disposed over the web's surface could be used to control coating thickness.

Web 50 is coated as it passes through the coating bank 40 to form coated web 52. Preferably, the web 50 is part of a roll-to-roll web-line. The present invention is capable of coating a large variety of web materials. Nonlimiting examples include paper, release paper, synthetic and natural fabrics, leather, woven fabrics, nonwoven fabrics, sheeting material, web foam material, continuous flexible belts, plastic films, composites, and flexible molds such as silicone rubber with shapes molded in. In some embodiments, the web is purchased in a large roll. In other embodiments, the web can be formed prior to processing in the coating apparatus; for example, a nonwoven web can be formed by melt-blowing. In a preferred embodiment, the web comprises metal-coated glass beads embedded in a polyethylene layer on a paper carrier; after the polymer precursor composition is applied and cured, the paper carrier and polyethylene layer can be stripped off to reveal retroreflective sheeting. Such retroreflective sheeting products are described in earlier patents issued to the 3M Company, such as U.S. Pat. Nos. 5,128,804, and 5,200,262.

The carrier roll 60 is preferably smooth and uniform for even coatings; however, in some instances it may be desirable to use a patterned carrier roll to obtain varying coating thickness. Bumps or debris on the carrier roll can cause defects in the coating. Also, temperature control and thermal conductivity of the carrier roll can affect the thermal expansion of the roll and, therefore, the coating gap uniformity. The carrier roll is preferably sufficiently large so that the mechanical bend due to coating forces is within an acceptable range. A larger size coating roll may also be easier to clean, thereby avoiding coating defects caused by debris buildup on the roll. The carrier roll is preferably a rotating roll that is mechanically driven or rotates freely from contact friction with the web. Less preferably, the carrier roll can have shapes such as a flat bed or stationary roll or curved surface.

The coating bank 40 is disrupted by disrupter 70. The disrupter can be a static or active disrupter. Static disrupters are nonmoving plates, foils, or complex shapes such as spiral-shaped rods that are disposed within the coating bank that create turbulent flow around the static disrupter to disrupt formation of gels within the bank. Complex shapes, such as spiral-shaped rods, that create turbulent flow are generally preferred as static disrupters. This is to be distinguished from a plate on one side of a coating bank that simply creates rolling flow within the coating bank—the inventive static disrupter is not merely a knife member on one side of a coating bank that creates a rolling flow. Rolling flow within the coating bank can result in a relatively static area within the center of the bank, leading to a rope of solid material that forms in this bank.

Preferably, the disrupter is an active disrupter. In some cases, an active disrupter can project energy into the coating bank to disrupt the formation of solids. One example is a sound beam projector (such as a transducer head) that is immersed in the coating bank. More preferably, the active disrupter is a moving probe 70 that disrupts solid formation by physically moving through and disrupting the coating bank. The probe can take on a variety of shapes. Examples of suitable shapes include: straight-bar, mixing paddle, pointed tip, flattened tip, and strip or boat elongated in the direction parallel the coating bar. A multi-prong disrupter is preferred over a single-prong because it provides better mixing. The probe can move in a straight line, zig-zag, wave pattern or other path through the coating bank. In some embodiments, the probe may move in more than one direction. For example, in a preferred embodiment, the probe is a rotating paddle that moves along the length of the coating bank while rotating.

Figure 2:
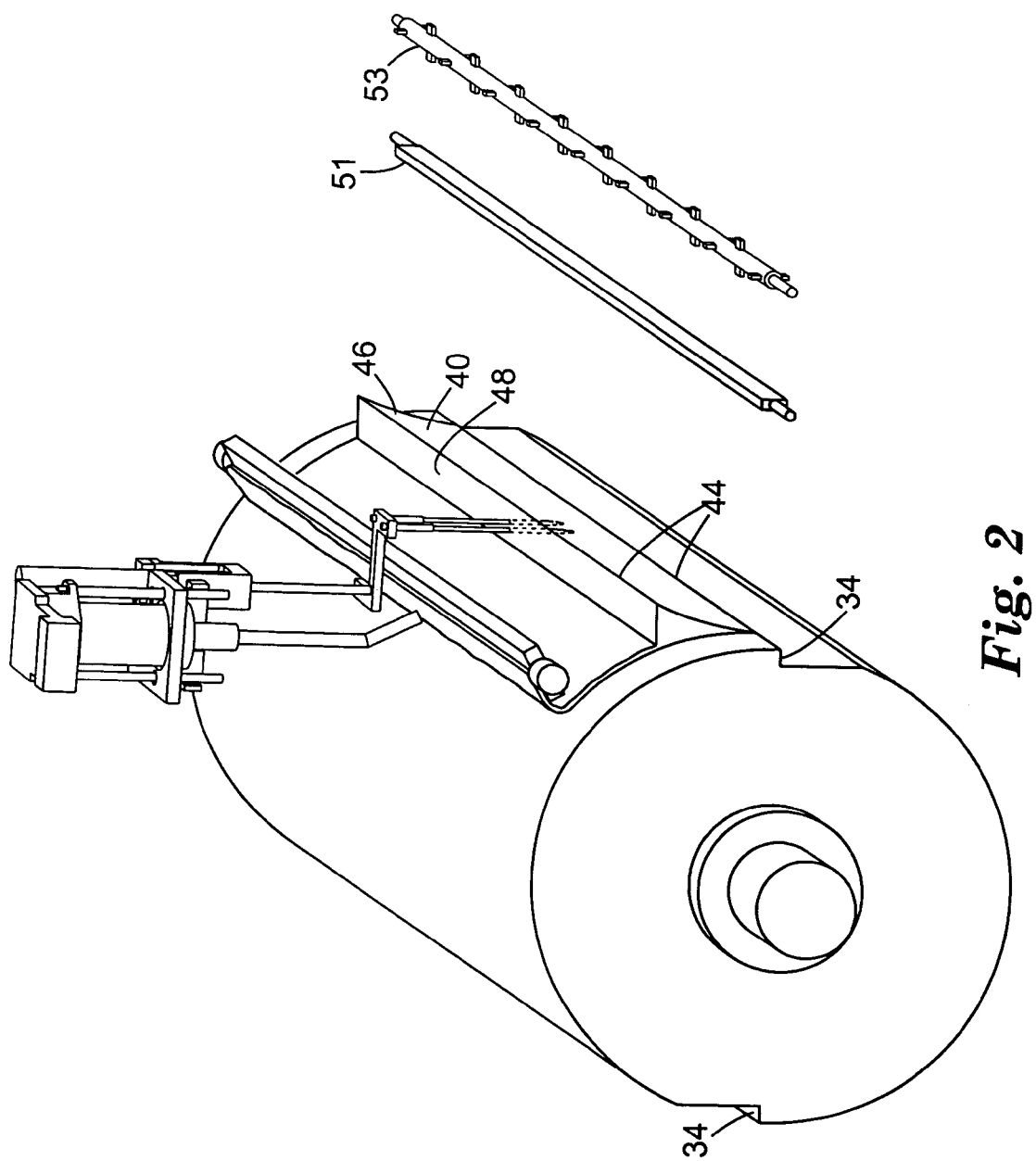
FIG. 2 is an elevated front and side view of the apparatus of FIG. 1. The web and carrier roll have been removed for a better view of the polymer precursor composition bank. The right side of the drawing illustrates two alternate active disrupter designs.
Figure 3:
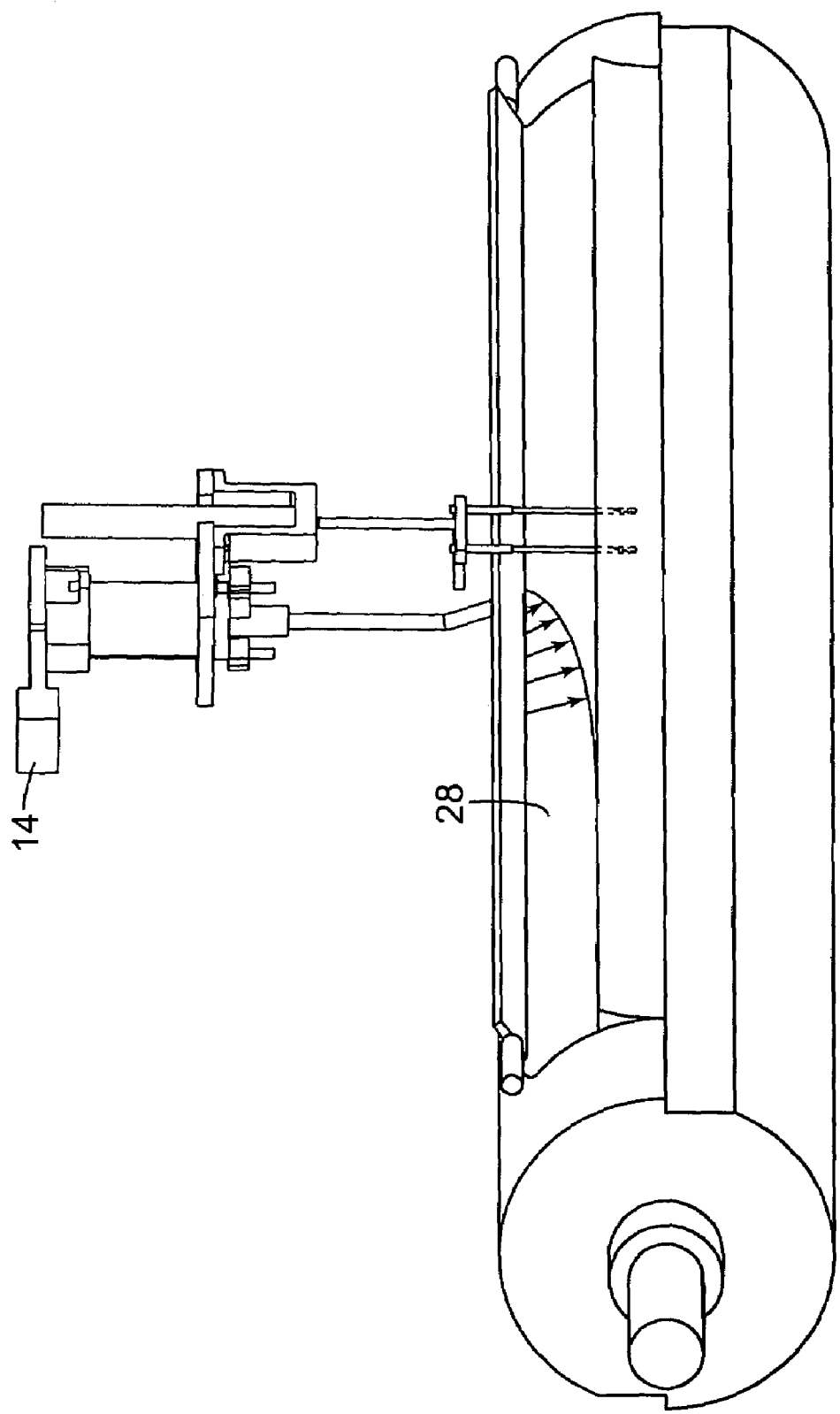
FIG. 3 is a front and side view of the coating apparatus with the web and carrier roll removed. The direction of fluid flow is indicated by the arrows.

Two other active disrupter designs are illustrated on the right side of FIG. 2. Straight paddle 51 or knobbed (PA2) or pinned bar 53 can be positioned in, and along, the length of the coating bank and rotated about their length.

In a preferred construction, the probe 70 is attached to the oscillating dispenser 10. This configuration is economical and assures mixing throughout the entire length of oscillation. The attachment can be by a threaded probe mount 78 or other suitable means. In an alternative embodiment, the probe is driven separately from the oscillating dispenser.

Figure 4:
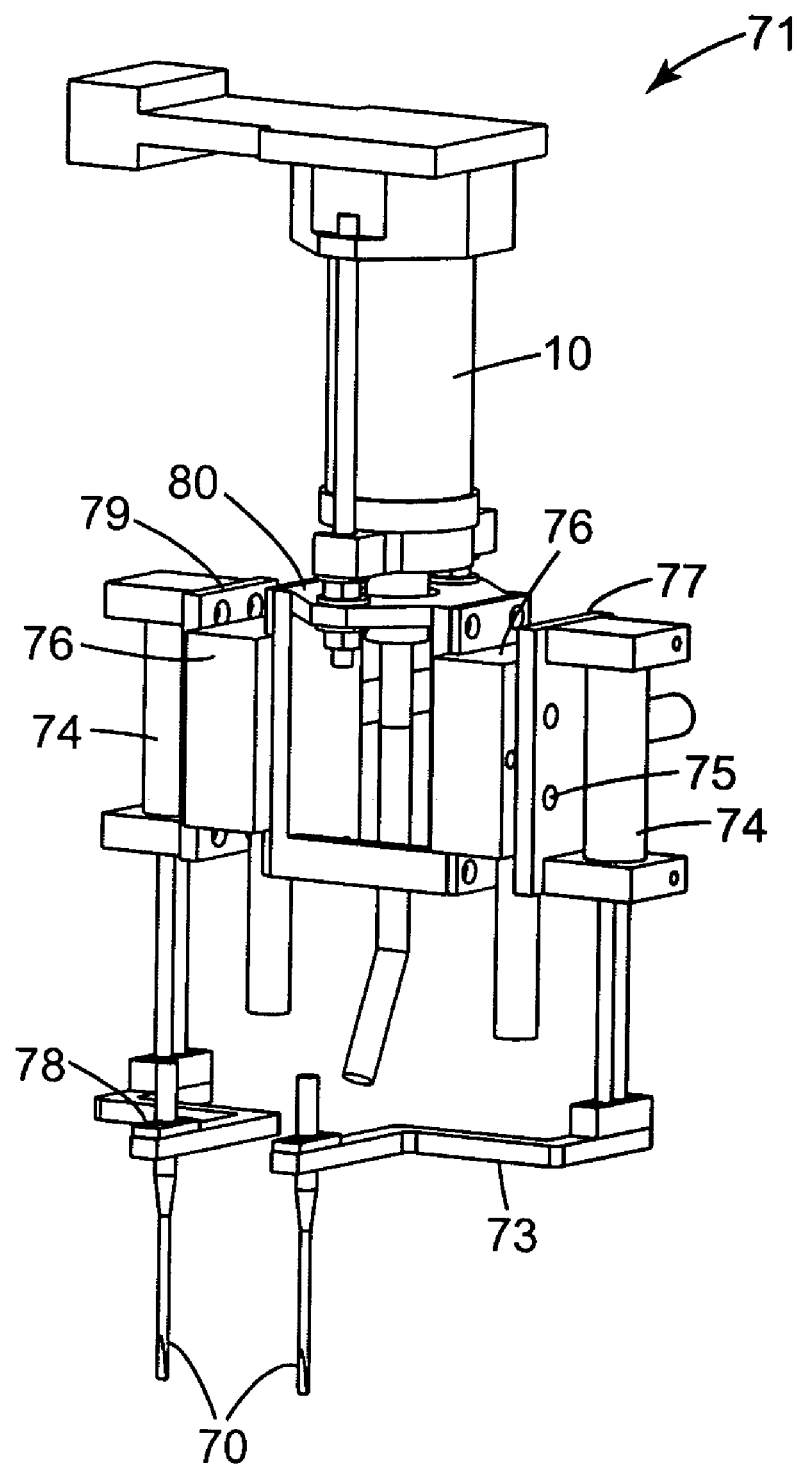
FIG. 4 illustrates a retractable probe assembly.

A preferred probe assembly 71 is shown in FIG. 4. Air cylinders 74 can upwardly or downwardly move probe holder 73. The upward position is the standby position and the downward position is the operating position. The multiaxis stage 76 has knobs (not shown) for moving the operating position of the probe 70 (along with parts 73, 74, 77 and 78) forward and backward and up and down (this adjustment is much finer than the up and down movement of the air cylinders). The air cylinders are attached to the multiaxis stage by mounting plates 77. The spacing between the probes is determined by the shape of probe holder 73. Changing the shape of the probe holder allows for narrower or wider spacing of the probes.

Figure 5:
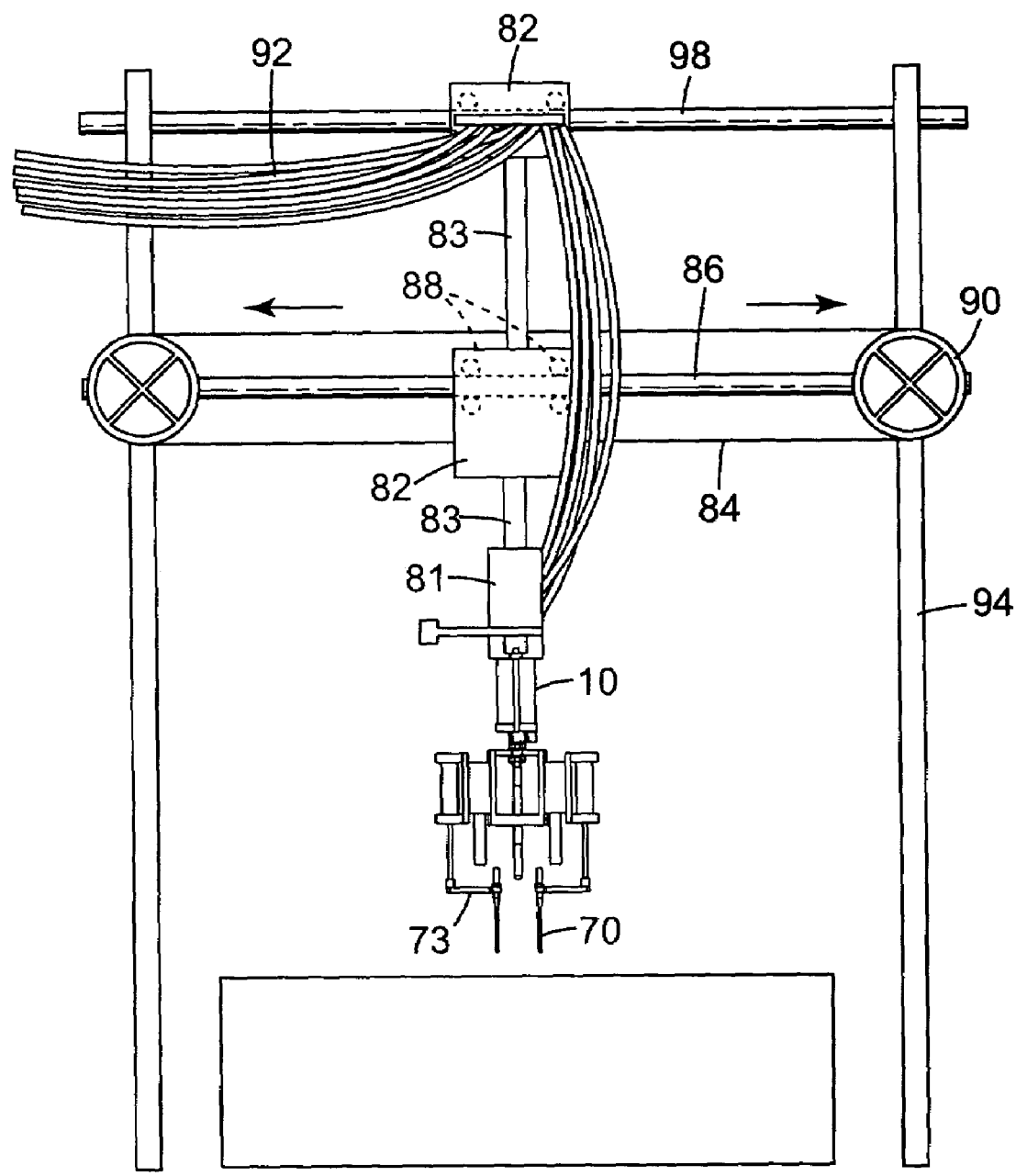
FIG. 5 illustrates oscillating apparatus for oscillating a dispenser and bank disrupter probe.

A front view of an embodiment of oscillating apparatus is illustrated in FIG. 5. The dispenser 10 and the dispenser motor 81 are attached to dispenser trolley assembly 82 by support cylinder 83. Dispenser trolley assembly 82 is connected to drive belt 84 and pulled over main rail 86 on bearing wheels 88. Drive wheels 90 are mounted on main rail 86. The drive wheels are powered by an electric motor (not shown) and the motion of the drive wheels pulls the trolley assembly 82 back and forth along rails 86 and 98. The trolley assembly has a set of twelve bearing wheels 88 (eight on main rail 86 and four on support rail 98). Feed lines 92 carry chemicals from the storage tanks (not shown) to dispenser 10. Feed lines oscillate along top support rail 98 such that the feed lines oscillate along with the dispenser trolley assembly 82.

The polymer precursor composition 20 contains reactive chemical components that react to form higher molecular weight species. As the reaction proceeds, the viscosity of the composition increases. The apparatuses and processes of the invention are broadly applicable to a very wide range of polymer chemistry. Typically, the polymer precursor composition is thermally reacting (including thermally reacting at room temperature or below). A "thermally reactive" composition is a composition that reacts, without the need for photon energy, to form a composition having a higher viscosity at low shear rates (this change in viscosity is due to the formation of higher molecular weight species in the composition). However, the composition could additionally, or in the alternative, comprise a photo reacting chemical system that reacts in the presence of photon energy to form compounds that increase viscosity. For example, the composition can contain a commercially available catalyst that can generate a lewis acid when exposed to photons, and thus catalyze polymerization. Preferably, the chemical system is thermally reacting at temperatures below 300EC, more preferably below 200EC, and still more preferably between about 80EC and about 120EC.

Nonlimiting examples of chemical systems include systems for forming: polyurethanes, polyethers, polyesters, polyacrylates, polyamides, epoxy resins, polycarbonates, polyolefins, polyureas, polyvinyls, neoprene, block copolymers, ordered and random copolymers, and mixtures of polymers. For example, as is well known, poloyols and isocyanates can be reacted to form polyurethanes, diamines and isocyanates can be reacted to form polyureas, epoxides can be reacted with diamines or diols to form epoxy resins, acrylate monomers or oligomers can be polymerized to form polyacrylates, diacids can be reacted with diols or diamines to form polyesters or polyamides. Examples of suitable systems can be found in Crandall, U.S. Pat. No. 5,645,938, WO 99/06858, and WO 96/16343, Crandall, U.S. Pat. No. 6,416,856, Melby, U.S. Pat. No. 4,876,308, Moren, U.S. Pat. No. 5,587,502, and Fleming, U.S. Pat. No. 5,976,669, and U.S. patent application Ser. No. 09/335,068, now abandoned.

The polymer precursor composition may also contain modifiers such as adhesion promoters (such as silane adhesion promoters where polymer is to be bonded to a silica, aluminum or other hydroxy-containing surface), dispersants, surface leveling agents, dyes, flame retardants, fillers, solvents, cross-linking agents, plasticizers, reactive diluents (such as acrylate monomers), flakes, pigments, thermal and ultraviolet stabilizers, reflective particles, spheres (such as glass spheres), and catalyst.

Preferably the polymer precursor composition contains essentially no solvent. In other preferred embodiments, the polymer precursor composition contains less than 10 weight percent nonreactive components, more preferably less than 5 weight %, and still more preferably the polymer precursor composition does not contain any nonreactive components, i.e., no components, other than catalysts, that will not react to form covalent bonds.

Using apparatus having multiple storage tanks with feed lines from each tank enables rapid changes in the chemistry of the coating composition by varying flow rates from selected tanks, turning flows on or off, and/or changing tanks. The composition can be changed during a single run. For example, the process can initially produce coated fabric for rainwear and then, by adjusting flow rates, instantly change to produce coated fabric for footwear.

An advantage of the disclosed embodiments is their ability to form smooth coatings utilizing relatively fast setting chemistry. Thus, the polymer precursor composition can be characterized in terms of its setting time. In the present invention, setting time is defined by the following test. A sample of polymer precursor composition is collected immediately after mixing. This is either as the composition exits the dispenser tube or, if mixing is done in the coating bank, immediately after mixing in the coating bank. The collected polymer precursor composition is transferred immediately and tested in a Brookfield Viscometer using Brookfield Spindle No. 3 at 0.3 revolutions per minute. In a preferred embodiment, the polymer precursor composition reaches a viscosity of at least 300,000 centipoise (cp) in 30 minutes or less (that is, the setting time is 30 minutes or less); more preferably the polymer precursor composition reaches a viscosity of at least 300,000 in 2 to 20 minutes; still more preferably in 4 to 10 minutes. Exceedingly fast setting times can be undesirable because streaking can result. Another advantage of the present invention is that it does not require the polymer precursor composition to be a shear-thinning material. Thus, in separate embodiments, the polymer precursor composition can be selected to be shear-thinning or essentially non-shear-thinning.

In another aspect, compositions are provided that contain, or are made from, a prepolymer that is made from a mixture of a diisocyanate (OCN—X—NCO) and a diol in a molar ratio (diisocyanate:diol) that ranges from about 2:1 to about 10:1, more preferably about 3:1 to about 5:1, and still more preferably about 4:1. A preferred diol has a molecular weight (weight average) in the range of 1000 to 10,000. The diisocyanate can be any diisocyanate as is known for forming a polyurethane or urethane containing polymer. An example of a preferred diisocyanate is diphenylmethane diisocyanate (MDI) and an example of a preferred diol is the commercially available diol Capa 720™ which is a 2000 molecular weight (weight average) diol. Prepolymers made from this ratio of diisocyanate and diol provide advantages such as stability and safety. Prepolymers having too low a diisocyanate:diol ratio, can generate unacceptably high viscosities and may be unsuitable for storage or pumping. On the other hand, isocyanates that have not been converted into prepolymers (e.g., have not been reacted with a diol) can volatilize and present environmental and safety problems such as respiratory irritation. In a preferred embodiment, the prepolymer is stored for more than an hour, more preferably more than a day, before it is reacted with other materials. Preferably, the prepolymer is storage stable such that its viscosity changes by less than 10% over a period of 10 days. The desirable properties of this prepolymer apply to a wide variety of processes, and, therefore, the use of this prepolymer is not limited to the coating processes described herein.

For making a final coating composition, the prepolymer is reacted with additional polyol. Preferably, the prepolymer is reacted with an amount of polyols that is sufficient to react with all the isocyanates in the prepolymer composition. The polyol can be made up of a single type of polyol (such as "pure" Capa 720™, sold by Solvay Interox of Chesire, UK) or, more preferably, several types of polyols (such as a mixture of diols and triols). The addition of triols can result in a stronger and less flexible coating. While the prepolymer can be stored for weeks or months, the composition formed after the addition of additional polyols tends to rapidly cure to a high viscosity state that can be unsuitable for coating. Therefore the composition is preferably coated onto a substrate shortly after mixing, preferably the coating composition is coated onto the substrate less than 20 minutes, more preferably less than about 10 minutes after mixing with additional polyols. In a preferred embodiment, the prepolymer is combined with additional polyols in mixing head 10 just prior to dispensing. In another embodiment, the prepolymer and additional polyols are separately dispensed from different dispensers and combined in the coating bank.

It has also been surprisingly discovered that superior coatings can be achieved by using a mixture of adhesion promoters. More specifically, it has been surprisingly discovered that superior coatings can be obtained from compositions containing a mixture of dialkoxy and trialkoxy hydroxyalkylenecarbamoylalkylene-alkoxysilanes as compared to a composition containing only the pure dialkoxy or trialkoxy adhesion promoter. The hydroxyalkylenecarbamoylalkylene-alkoxysilanes preferably have the structure as described by Moren et al. in U.S. Pat. No. 5,587,502. Preferably, this structure is (HO)—$CR^1R^2$—$CR^3R^4$—$[CR^5R^6]_m$—O—C(O)—$NR^7$—$R^8$—$SiR^9_{(3-n)}(OR^{10})_n$, where each $R^1$, $R^2$, $R^3$, $R^4$, $R^5$, $R^6$ and $R^9$ is independently hydrogen, a linear, branched or cyclic alkyl group having 1 to 18 (preferably 1 to 6) carbon atoms, optionally comprising 1 to 3 non-terminal oxygen, sulfur, nitrogen or carbonyl groups in the hydrocarbon backbone of the alkyl group and optionally substituted with a halo, nitro or cyano group, or an alkyl, alkyloxy, alkylthio, dialkylamino or carboalkoxy group each having 1 to 18 (preferably 1 to 6) carbon atoms; $R^7$ is hydrogen or a linear, branched or cyclic alkyl group having 1 to 18 (preferably 1 to 6) carbon atoms, optionally comprising 1 to 3 non-terminal oxygen, sulfur, nitrogen or carbonyl groups in the hydrocarbon backbone of the alkyl group; $R^8$ is a linear, branched or cyclic alkylene group having at least 2 (preferably 2 to 10) carbon atoms; $R^{10}$ is a linear, branched or cyclic alkyl group having at least 2 (preferably 2 to 6) carbon atoms, optionally comprising 1 to 3 non-terminal oxygen, sulfur, nitrogen or carbonyl groups in the hydrocarbon backbone of the alkyl group; m is 0, 1 or 2; and n is 1, 2, or 3. The term dialkoxy refers to the structure having two alkoxy groups attached to the terminal silicon (Si—$(OR)_2$) and trialkoxy refers to the structure having two alkoxy groups attached to the terminal silicon (Si—$(OR)_3$). Coatings made with only trialkoxy adhesion promoters can suffer from embrittlement as they age, while coatings made with only dialkoxy adhesion promoters can exhibit low stiffness. Through experimentation, it was found that by mixing the dialkoxy and trialkoxy adhesion promoters, coatings can be obtained exhibiting good adhesion and strength and which exhibit relatively little embrittlement with age. A set of experiments with dialkoxy, trialkoxy and a mixture of di- and tri-alkoxy adhesion promoters is described in the Examples section.

Figure 7:
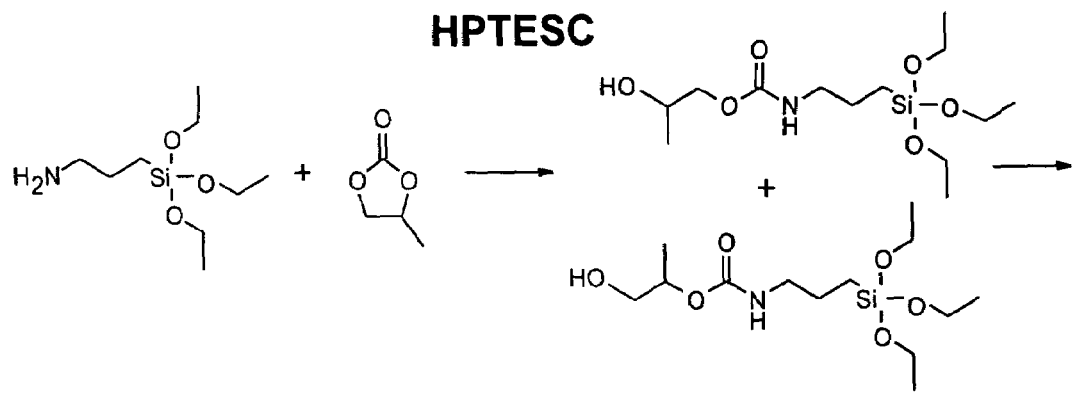
FIG. 7 illustrates a synthesis scheme for preparing dialkoxy and trialkoxy hydroxyalkylenecarbamoylalkylene-alkoxysilane adhesion promoters.
Figure 7:
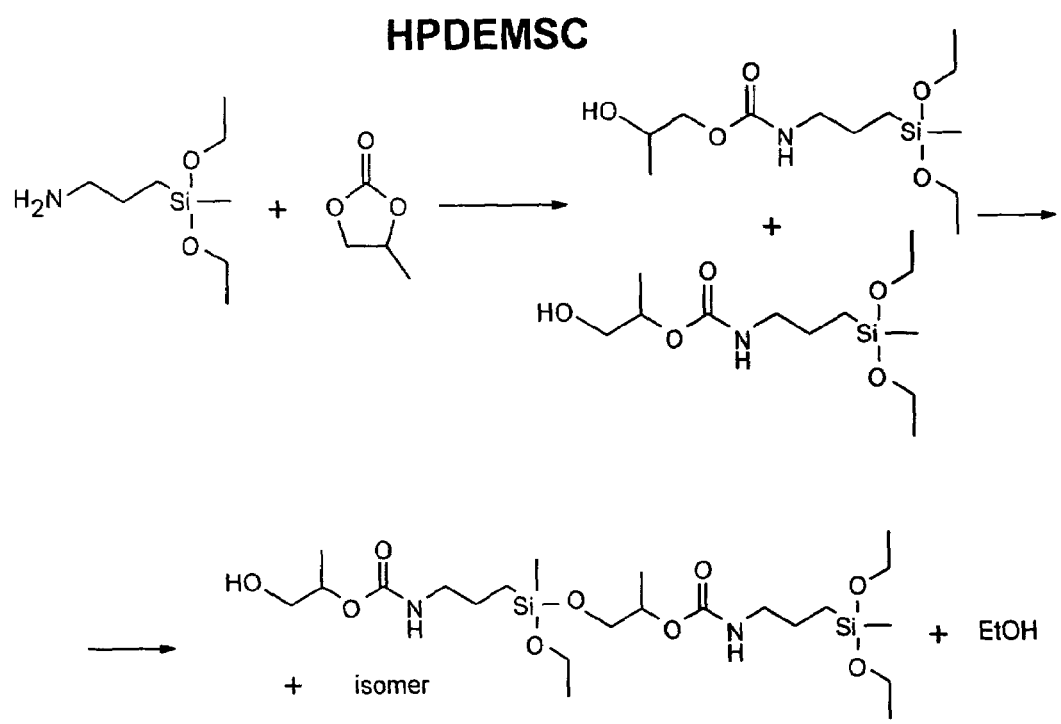

The hydroxyalkylenecarbamoylalkylene-alkoxysilanes are especially useful for enhancing adhesion to surfaces having hydroxy groups or surfaces that can be modified to have hydroxy groups. Preferably, a composition for forming a polyurethane comprises about 0.1 to about 10 weight % hydroxyalkylenecarbamoylalkylene-alkoxysilane adhesion promoters, more preferably 2 to 6%. In preferred compositions, the hydroxyalkylenecarbamoylalkylene-alkoxysilane adhesion promoters comprise the dialkoxy and triakoxy hydroxyalkylenecarbamoylalkylene-alkoxysilane adhesion promoters added in a molar ratio (moles dialkoxy:moles trialkoxy) ranging from about 1:3 to about 3:1, more preferably about 1:2 to 2:1, and still more preferably about 1:1. One preferred mixture of adhesion promoters contains 2-hydroxy-1-methylethyl N-[3-(1,1-diethoxy-1-methylsilyl)propyl]carbamate (HPDEMSC) and 2-hydroxy-1-methylethyl N-[3-(1,1,1triethoxy silyl)propyl]carbamate (HPTESC). HPDEMSC and HPTESC can be prepared as illustrated in FIG. 7.

The process conditions for carrying out the coating process can be controlled to suit the particular chemistry utilized. Each component of the apparatus can have its own temperature control. In conventional processes, coating mixtures often contain solvent in order to lower viscosity. In general, higher temperatures cause lower viscosity; however, higher temperatures also cause faster reactivity which can lead to fast polymerization and undesirably high viscosity and clogged equipment and/or uneven coatings. An advantage of the disclosed embodiments is that use of a coating bank disrupter allows operation with little or no solvent and at temperature conditions that would be unsuitable for nondisrupted processes. The oscillation speed is preferably sufficiently fast so that no portion of the coating bank becomes starved, but not so fast that the apparatus shakes. Thus, the oscillation is preferably between about 10 and about 40 cycles/min where each cycle is between about 0.5 and about 3 m (a cycle is a complete back and forth circuit). Preferably, the web speed is at least 3 m/min, more preferably between about 10 and 50 m/min.

Figure 6:
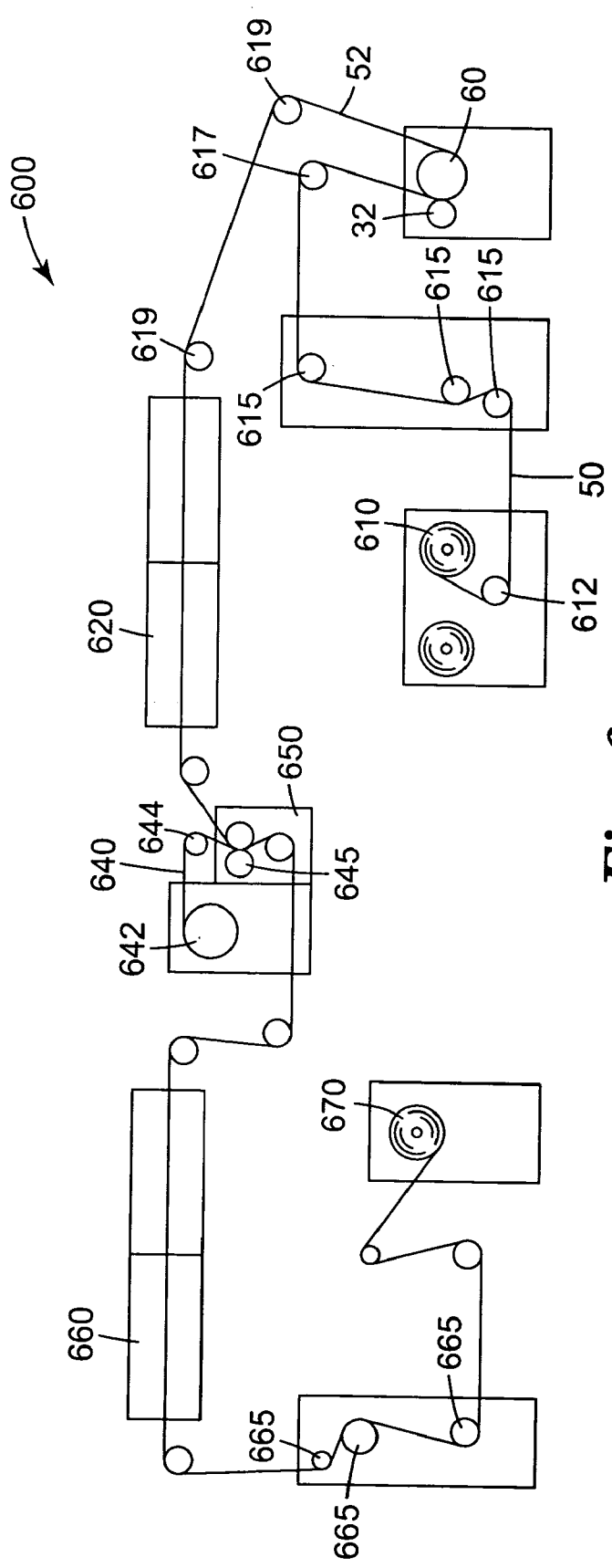
FIG. 6 is a schematic side view illustrating a production line for applying a coating to a web.

A schematic overview of a production line 600 including the inventive apparatus is illustrated in FIG. 6. Unwind 610 contains a roll of web 50 that traverses roller 612 and is carried overhead by rollers 615. The web then traverses over roller 617 and travels down and between coating bar 32 and carrier roll 60. The coated web 52 is again carried upward past rollers 619 and into curing oven 620. A second web material 640 is unwound from roll 642, past roller 644, and laminated onto the coated surface of coated web 52 with pressure applied by roller 645 at laminating station 650. The laminated material (web 640/polymer coating/web 50) then passes into the second curing oven 660, down past rollers 665 and is wound up on roll 670.

Numerous articles can be made from the apparatuses and processes of the present invention. These articles can demonstrate a variety of desirable properties such as durability, flexibility, abrasion-resistance, laundering durability. The inventive process can also be utilized to produce foamed layers.

Figure 8:
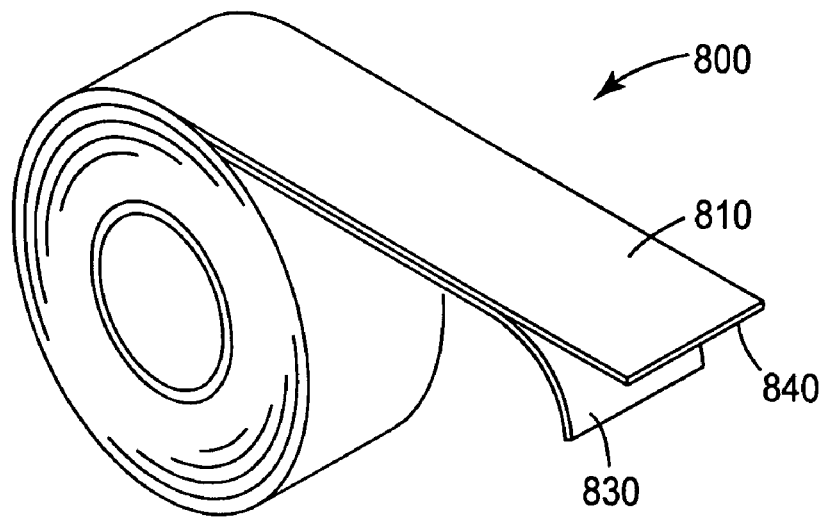
FIG. 8 illustrates a roll of tape.

FIG. 8 illustrates a roll of tape 800 that is laminated on release sheet 830. The tape could be retroreflective sheeting with beads on one surface and a pressure sensitive adhesive on the other surface. In this case, the article could be made by a process in which retroreflective sheeting (such as a laminate of paper/polyethylene/glass beads/vapor-coated aluminum) is coated with an adhesive layer 840 as it passes by coating bank 40. In the apparatus schematically illustrated in FIG. 6, the retroreflective sheeting can be laminated with an adhesive layer that is partly cured in oven 620, laminated with a nonwoven fabric in 650 and cured in oven 660. The paper/polyethylene layer can be stripped off and a release layer applied to the back of the nonwoven fabric by a pressure sensitive adhesive. Articles incorporating the tape, especially where the tape is retroreflective, include: helmets, motorcycles, shoes, and clothing.

Figure 9:
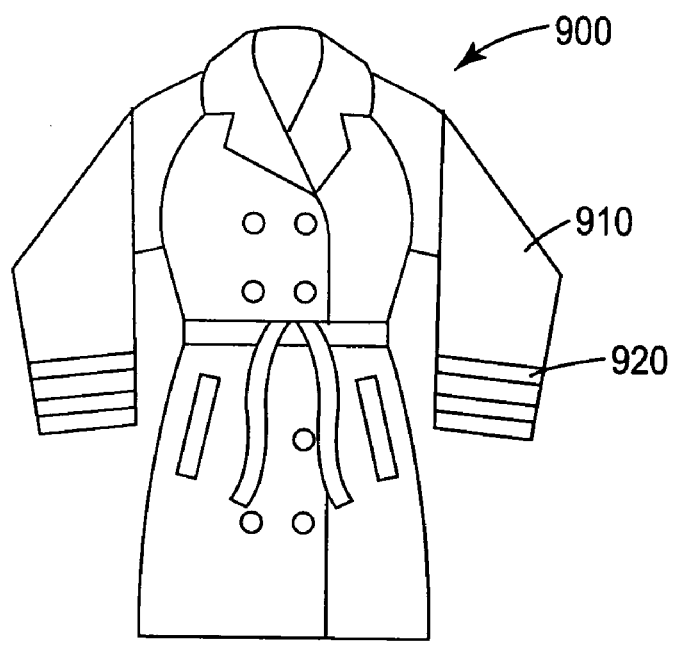
FIG. 9 illustrates a type of waterproof apparel.

FIG. 9 illustrates a raincoat 900 that can be made from fabric that is made by apparatus and processes of the present invention. Preferably, the entire fabric 910 is coated by processes of the invention. Additionally, or in the alternative, stripes, such as retroreflective stripes 920, can be made by processes of the invention and sewn or adhered onto articles of clothing.

One of the advantages of the disclosed embodiment is the ease of cleaning that can be achieved. When the coating process is discontinued, such as while the web is changed or repaired or during other downtimes, there is the potential problem that reactive components could set within the dispenser or on the dispersive surface. In the present invention this can be conveniently alleviated by passing a cleaning solution through the chemical dispenser. While cleaning solution is passed through the dispenser, the dispenser can oscillate over the dispersive surface and thus quickly and automatically clean the apparatus including dispersive surface 30 and affected portions of carrier roll 60. Preferably this is accomplished by a separate cleaning solution feed line into the chemical dispenser. Preferred cleaning solutions include hot dibasic ester (DBE) and organic solvents such as methyl ethyl ketone. During downtime, the chemical dispenser can also be moved to a holster (not shown) with a drain below (also not shown), and cleaning solution passed through and into the drain.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

EXAMPLES

Example 1

A Urethane Processing Machine was obtained from Max Machinery, Inc., Healdsburg, Calif. This machine consisted of a blend cart, main cart, fluid transport lines, and a pin mixer attached to rails, on which the mixer oscillated. Some aspects of this machine are similar to those shown on the Max Machinery web site, www.maxmachinery.com (e.g., Linear Guide Systems). Additional information regarding the machine may be found in "Urethane Processing System: Instruction Manual," publication no. MM 600-000-350 (Rev. 1/98) Max Machinery, Inc. Various of the components that were used in making the coated web are illustrated in FIGS. 1–6. The pin mixer had inlets connected to five separate fluid transport lines from tanks A–E. Lines A and B are combined in a single injector, and lines C, D and E are combined in a single injector just prior to injection into the pin mixer.

The blend cart contained Tanks F, G, H, and I (see Table 1). The blend cart metered and blended four components and the blended material was fed through a single line to tank D on the main cart. The main cart, containing tanks A–E, pumped and metered the components in separate lines to the oscillating pin mixer as shown in Tables 1 and 2. The Vibrathane 9041 is a isocyanate prepolymer prepared by reacting a 4:1 molar ratio of Mondur ML (MDI) and Capa 720™. The silane carbamate is a 50/50 by weight solution of 2-hydroxy-1-methylethyl N-[3-(1,1-diethoxy-1-methylsilyl)propyl)carbamate (HPDEMSC) and 2-hydroxy-1-methylethyl N-[3-(1,1,1-triethoxy-1-methylethyl N-[3(1,1,1-triethoxy silyl)propyl]carbamate (HPTESC) that was prepared as illustrated in FIG. 7. The HPDEMSC was synthesized using the following procedure: 195.6 pounds (430 kg) of 3-aminopropylmethyldiethoxy silane was added to a clean, dry fifty gallon reactor. The reactor was heated to 50° C. 104.4 pounds (230 kg) propylene carbonate was added dropwise, keeping the reactor at 48–52° C. with agitation. After all the propylene carbonate was added the reaction was stirred for 5 hours at 50° C. The reaction mixture was then cooled to 30° C. and tested for purity with gas chromatography. The HPTESC was synthesized using the following procedure: 205.3 pounds (452 kg) of 3-aminopropyltriethoxy silane was added to a clean, dry fifty gallon reactor. The reactor was heated to 50° C. 94.7 pounds (208 kg) propylene carbonate was added dropwise, keeping the reactor at 48–52° C. with agitation. After all the propylene carbonate was added the reaction was stirred for 5 hours at 50° C. The reaction mixture was then cooled to 30° C. and tested for purity with gas chromatography.

TABLE 1

Urethane Precursor components.

| Tank | Material | Supplier | Function | weight % | flow rate (g/min) |
|---|---|---|---|---|---|
| A | Vibrathane 9041 | CK Witco Uniroyal | isocyanate prepolymer | 61.87 | 2902.9 |
| B | silane carbamate | 3M Corp. | adhesion promoter | 4.00 | 187.7 |
| C | Syn Fac 8009 | Milliken Co. | polyol | 18.70 | 877.4 |
| D | blend of F, G, H, I | | | 3.47 | 163.0 |
| E | Capa 720 | Solvay-Interox | polyol | 11.96 | 561.2 |
| F | Perstorp TP30 | Perstorp | polyol x-linker | 3.21 | 7757.4* |
| G | Reactint X95AB | Milliken Co. | dye | 0.14 | 345.2* |
| H | DBTDL** | Elf Atochem | catalyst | 0.0016 | 3.9* |
| I | ZR-50 | Huntsman | catalyst | 0.12 | 293.0* |

*Components from Tanks F-I were pumped at these rates into Tank D until Tank D was full, at which point the flow from Tanks F-I was cut off until Tank D got near to empty, at which point pumping resumed.
**dibutyltindilaurate

TABLE 2

| Tank | Temperature Conditions | |
|---|---|---|
| | Tank Temp (EC) | Line Temp (EC) |
| A | 69 | 70 |
| B | 25 | 27 |
| C | 59 | 60 |
| D | 59 | 60 |
| E | 63 | 59 |
| F | 60 | 60 |
| G | 69 | 70 |
| H | 21 | 23 |
| I | 25 | 24 |

The total flow rate of dispensed material was 4,692 g/min. The as-dispensed composition had a gel time of 7 minutes, meaning that if 10 ml were dispensed into a vial, after 7 minutes, if the sample were tipped to horizontal, the solution would flow less than 5 mm in 30 seconds. The carrier web speed was 80 feet/min and the gap between the coating bar and web was approximately 10 mils (0.25 mm).

The solution was dispensed onto the coating bar in an oscillatory manner just above the coating bank such that the composition would flow down the coating bar into the coating bank. The pin mixer was oscillated at a speed of 50 inches/second (125 cm/s). The oscillator traversed approximately 46 inches (120 cm) in the center portion of the web with edge dams in place to coat about a 51 inch (129 cm) width on a 52 inch (131 cm) web. The oscillator would stop alternatingly between about 7.5 inches right or left of the web center. The frequency of this stopping was once every 1.5 cycles, but can be adjusted from once every 0.5 to 5.0 cycles as required to maintain a uniform bank. Except for the intermittant stopping, ramping speed up and down from the stopping point and slowing near the edges and reversing, the pin mixer travelled at a constant speed back and forth across the web width. A two-pronged probe extended from the pin mixer into the center of the rolling bank and was oscillated with the dispensing solution. The probes mixed the solution in the rolling bank to avoid build-up of gel particles.

In order to keep the coating bar straight (the bar will bend due to coating pressures and thermal expansion), the coating bar was maintained at a temperature of 150EF (66EC) by flowing 66EC glycol/water through the core of the coating bar.

The carrier web was kraft paper coated on one side with polyethylene. The polyethylene was coated with 60 micron diameter high refractive index glass beads vapor coated with approximately 200 angstroms of aluminum. This type of web has been described in numerous prior patents such as U.S. Pat. Nos. 5,128,804, and 5,200,262.

The coated web was passed through 180 feet of air 220EF (104EC), then a 100% polyester fabric (Milliken & Co.) was laminated to the coating. The web was passed through a 220EF (104EC) oven with 500 feet of web path. The web was then wound up into a large roll of approximately 1000 yards (900 m).

Example 2 and Comparative Examples 3 and 4

Example 2 and Comparative Examples 3 and 4 demonstrate advantages resulting from the use of compositions containing a mixture of di and trialkoxy hydroxyalkylenecarbamoylalkylene-alkoxysilane adhesion promoters. The procedure for making these testing samples used was as follows: Capa 720, SynFac 8009, Voranol 234–630 (now Perstorp TP30), DBTDL, and 2,2' dimorpholinodiethylether (DMDEE) were added to a glass 8 oz. jar, stirred, and degassed at <1 torr for 5 minutes. The Vibrathane 9041 and silane carbamates were then added and the mixture was stirred. The adhesive was coated onto retroreflective sheeting (paper/polyethylene/glass beads/aluminum vapor coat) using a notch bar coater set at a 6 mil gap. The adhesive coated carrier was placed into an oven and cured 2 minutes at 220° F. then a 100% polyester fabric from Milliken & Company was applied to the tacky adhesive then the sample was placed back into the oven and cured 10 minutes at 220° F. (104EC). After 1–2 weeks the carrier was stripped away.

| | Comp Ex 3 | Comp Ex 4 | Ex 2 |
|---|---|---|---|
| Capa 720 | 9.7 g | 9.6 g | 9.66 g |
| SynFac | 11.3 | 11.35 ] | 11.36 ] |
| Voranol | 3.0 | 3.1 | 3.04 ] |
| DBTDL | 0.02 | 0.01 ] | 0.02 ] |
| DMDEE | 0.02 | 0.06 ] | 0.05 ] |
| Vibrathan | 46.0 | 45.65 ] | 45.96 ] |
| HPDEMSC | 2.7 | 0 | 1.41 ] |
| HPTESC | 0 | 2.67 ] | 1.33 ] |

The resulting article was sown on fabric and tested for industrial laundering durability ("IW") according the procedures described in U.S. Pat. No. 5,976,669. Laundering durability testing was conducted on samples, as a function of time, using 10 cycles of washing and drying (either in a Maytag tumble dryer or a tunnel dryer) and measuring retroreflectivity (in candelas/lux/m$^2$). Initially (before washing) each sample had a retroreflectivity of about 550. Samples from the comparative examples were washed and dried together. Starting with week 6 (week 8 for the comparative examples), samples from Example 2 were washed and dried with the comparative examples. The results are shown in the table below:

| Comp Ex 3 Age (wks) | R'@10 IW cycles Maytag dry | R'@10 IW cycles Tunnel dry | Comp Ex 4 Age (wks) | R'@10 IW cycles Maytag dry | R'@10 IW cycles Tunnel dry | Ex 2 Age (wks) | R'@10 IW cycles Maytag dry | R'@10 IW cycles Tunnel dry |
|---|---|---|---|---|---|---|---|---|
| 4 | 0 | 0 | 4 | 165 | 202 | 4 | 54 | 0 |
| 8 | 0 | 0 | 8 | 191 | 210 | 6 | 193 | 0 |
| 19 | 0 | 0 | 19 | 0 | 0 | 17 | 141 | 119 |
| 49 | 0 | 29 | 49 | 0 | 128 | 47 | 125 | 297 |
| | | | 80 | 43 | 73 | 78 | 197 | 246 |

For a desirable level of performance, the retroreflective fabric should maintain a retroreflectivity of at least 100. Preferably, the retroreflective fabric maintains sufficient laundering durability after aging such that, after aging for at least about 80 weeks, followed by 10 cycles of industrial washing and drying, the fabric maintains a retroreflectivity of at least 100. As can be seen from the data, coated fabrics resulting from polymerizing a composition containing only the diethoxy adhesion promoter demonstrated poor laundering durability. Comparative Example 4, made from a composition containing only the triethoxy adhesion promoter exhibited quite good initial laundering durability; however, it was discovered that laundering durability deteriorated with time and after 80 (PA2) weeks the articles had unacceptable retroreflectivity after 10 laundering cycles. It is believed that this deterioration is due to a slow cross-linking reaction that embrittles the material over time. In contrast, retroreflective fabrics made from compositions containing a mixture of di- and triethoxy adhesion promoters, after aging for a few weeks, exhibited unexpectedly good laundering durability even after 78 weeks. Similarly good results have been observed in coated fabrics made using the disrupted-coating-bank process described above.

Also, surprisingly, preliminary results indicate that the materials made from a mixture of the di- and triethoxy adhesion promoters exhibited a lower Young's Modulus as compared with materials made from either the dialkoxy by itself or the trialkoxy by itself.

All patents mentioned herein are incorporated by reference as if reproduced in full below.

This invention may take on various modifications and alterations without departing from the spirit and scope thereof. Accordingly, it is to be understood that this invention is not to be limited to the above-described, but it is to be controlled by the limitations set forth in the following claims and any equivalents thereof. It is also to be understood that this invention may be suitably practiced in the absence of any element not specifically disclosed herein.

What is claimed is:

1. A composition comprising a mixture of dialkoxy and trialkoxy hydroxyalkylenecarbamoylalkylene-alkoxysilanes in which the molar ratio of dialkoxy to triethoxy hydroxyalkylenecarbamoylalkylene-alkoxysilane is in the range from about 1:3 to about 3:1.

2. The composition of claim 1 comprising polyols and isocyanates that can thermally react at temperatures below 200° C.

3. The composition of claim 1 comprising less than 10 weight % of nonreactive components.

4. The composition of claim 3 comprising less than 5 weight % of nonreactive components.

5. The composition of claim 4 containing essentially no solvent.

6. The composition of claim 4 having a setting time of about 2 to about 20 minutes.

7. The composition of claim 1 comprising a prepolymer that is formed from reacting a mixture comprising diisocyanates and diols in a diisocyanate:diol molar ratio ranging between about 3:1 to about 5:1.

8. The composition of claim 7 comprising a prepolymer that is formed by reacting a mixture comprising diisocyanates and diols in a diisocyanate:diol molar ratio of about 4:1.

9. The composition of claim 7 wherein the prepolymer is storage stable at room temperature such that its viscosity changes by less than 10% over a period of 10 days.

10. The composition of claim 1 wherein the alkoxy groups in the dialkoxy and trialkoxy hydroxyalkylenecarbamoylalkylene-alkoxysilanes are independently selected from the group consisting of ethoxy, propoxy, butoxy, pentoxy, and hexoxy.

11. The composition of claim 1 wherein the composition is shear-thinning.

12. The composition of claim 1 wherein the mixture comprises 2-hydroxy-1-methylethyl N-[3-(1,1-diethoxy-1-methylsilyl)propyl)carbamate (HPDEMSC) and 2-hydroxy-1-methylethyl N-[3-(1,1,1-triethoxy-silyl)propyl]carbamate (HPTESC).

* * * * *

UNITED STATES PATENT AND TRADEMARK OFFICE
CERTIFICATE OF CORRECTION

PATENT NO. : 6,991,745 B2
APPLICATION NO. : 10/752137
DATED : January 31, 2006
INVENTOR(S) : Fleming, Robert J.

It is certified that error appears in the above-identified patent and that said Letters Patent is hereby corrected as shown below:

<u>Column</u>
1, Line 29,            Delete ""Modem" and insert -- "Modern --, therefor.

<u>Column</u>
7, Line 22,            Delete "prescursor" and insert -- precursor --, therefor.

<u>Column</u>
9, Line 38 (Approx.),  Delete "poloyols" and insert -- polyols --, therefor.

<u>Column</u>
12, Line 5,            Delete "triakoxy" and insert -- trialkoxy --, therefor.
12, Line 13,           Delete "N-[3-(1,1,1triethoxy" and insert -- N-[3-(1,1,1-triethoxy --, therefor.

<u>Column</u>
14, Line 25 (Approx.), Delete "propyl)" and insert -- propyl] --, therefor.
14, Line 26 (Approx.), Delete "N-[3-(1,1,1-triethoxy-1-methylethyl".
14, Line 26 (Approx.), After "methylethyl" delete "N-[3(1,1,1" and insert -- N-[3-(1,1,1 --, therefor.

<u>Column</u>
16, Line 1,            After "air" insert -- floatation ovens at a temperature of --.

UNITED STATES PATENT AND TRADEMARK OFFICE
CERTIFICATE OF CORRECTION

PATENT NO. : 6,991,745 B2
APPLICATION NO. : 10/752137
DATED : January 31, 2006
INVENTOR(S) : Fleming, Robert J.

It is certified that error appears in the above-identified patent and that said Letters Patent is hereby corrected as shown below:

Column
18, Line 37,   In Claim 12, delete "propyl)" and insert -- propyl] --, therefor.
18, Line 38,   In Claim 12, delete "N-[3-(1,1,1-triethoxy-silyl)" and insert -- N-3-(1,1,1-triethoxy-1-methylsilyl) --, therefor.

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO.      : 6,991,745 B2
APPLICATION NO. : 10/752137
DATED           : January 31, 2006
INVENTOR(S)     : Robert J. Fleming It is certified that error appears in the above-identified patent and that said Letters Patent is hereby corrected as shown below:

Column 18,

Line 4, delete "triethoxy" and insert -- trialkoxy --.

Signed and Sealed this

Sixth Day of March, 2007

JON W. DUDAS
*Director of the United States Patent and Trademark Office*